*W. H. Andrews,*
*Reversible Latch.*
*No. 105,026.*          *Patented July 5, 1870.*
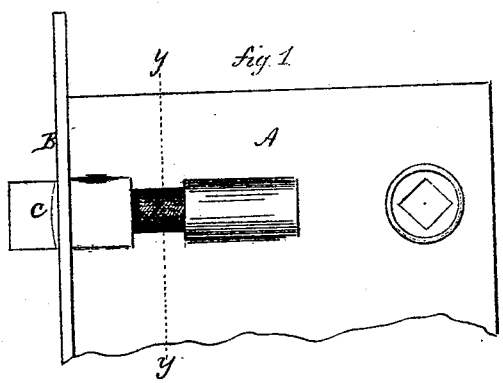
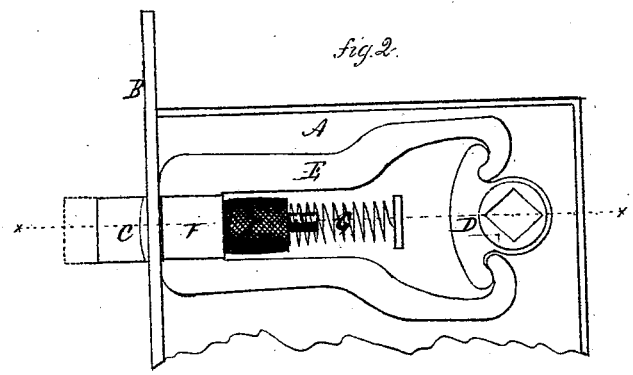
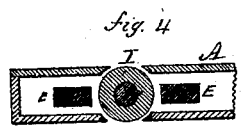
Witnesses,
J. H. Shumway
A. J. Tibbits
William H. Andrews
Assignor to Burton Mallory
Inventor
By Attorney
John E. Earle
N. PETERS, PHOTO-LITHOGRAPHER, WASHINGTON, D.C.

United States Patent Office.

WILLIAM H. ANDREWS, OF NEW HAVEN, CONNECTICUT, ASSIGNOR TO BURTON MALLORY, OF SAME PLACE.

Letters Patent No. 105,026, dated July 5, 1870.

IMPROVEMENT IN REVERSIBLE LATCH.

The Schedule referred to in these Letters Patent and making part of the same

*To all whom it may concern:*

Be it known that I, WILLIAM H. ANDREWS, of New Haven, in the county of New Haven and State of Connecticut, have invented a new Improvement in Reversible Latch; and I do hereby declare the following, when taken in connection with the accompanying drawings and the letters of reference marked thereon, to be a full, clear, and exact description of the same, and which said drawings constitute part of this specification, and represent, in Figure 1, a side view, Figure 2, the same, the plate removed, Figure 3, a section on line $x\,x$, and in Figure 4, a section on line $y\,y$.

This invention relates to an improvement in knob-latches, the object being to make the latch-bolt reversible, to adapt the lock to a right or left-hand door; and The invention consists in the arrangement of a nut upon the spindle of the latch-bolt, arranged so as to be operated through an aperture in the case, substantially as set forth, combined with a yoke through which the latch is operated, so that by the turning of the said nut the latch may be thrown out and set to any position, and then returned to the case.

A is the case.

B, the face-plate.

C, the latch-bolt.

D, the follower, of the usual form.

E, the yoke, upon which the follower operates, formed with a head, F, through which the spindle $a$ of the latch-bolt passes.

The latch-bolt is threaded, and extends through the head F, so as to receive a nut, I.

The nut I is held against the head F by a spiral or other suitable spring, G, so that the nut I binds the latch-bolt to the follower, as seen in fig. 3, and yet so that, by turning the nut I to one screw from the spindle, the bolt will be thrown out from the head F, as denoted in broken lines, figs. 2 and 3, carrying the head beyond the face-plate, so that the head may be turned to the right or left, then returning the nut, the latch is drawn back and held in position.

In order to thus adjust the bolt, I make an opening through the case, so that the nut may be reached without opening the case.

One great advantage of this construction is that I am enabled to make an extremely thin lock.

I do not wish to be understood as broadly claiming the attachment of the latch-bolt to the nut, as such is not new.

I claim as my invention—

The combination of the latch-bolt C, with its spindle $a$, with the yoke or connection E, and nut I, the said nut arranged upon the spindle of the latch-bolt, and so as to be operated through an aperture in the case, to throw out or draw in the latch-bolt, as the case may be, without opening the case, in the manner substantially as herein set forth.

WM. H. ANDREWS.

Witnesses:
 A. J. TIBBITS,
 J. H. SHUMWAY.